(No Model.)

T. GARE & T. S. HARDEMAN.
BLANK FOR COILED LOCK NUTS.

No. 582,525. Patented May 11, 1897.

Witnesses.
Thos. A. Gwin
Robert Goutt

Inventors
Thomas Gare.
Thomas S. Hardeman.
By James L. Norris
Atty.

UNITED STATES PATENT OFFICE.

THOMAS GARE, OF STOCKPORT, AND THOMAS S. HARDEMAN, OF MANCHESTER, ENGLAND.

BLANK FOR COILED LOCK-NUTS.

SPECIFICATION forming part of Letters Patent No. 582,525, dated May 11, 1897.

Application filed June 1, 1896. Serial No. 593,902. (No model.)

*To all whom it may concern:*

Be it known that we, THOMAS GARE, residing at 25 Booth Street, Edgeley, Stockport, in the county of Chester, and THOMAS SEPTIMUS HARDEMAN, residing at 137 Withington Road, Whalley Range, Manchester, in the county of Lancaster, England, citizens of England, have invented a new and useful Improvement in Blanks for Coiled Lock-Nuts, of which the following is a specification.

Lock-nuts have been made by helically coiling a metal bar on a mandrel, so as to produce a hollow cylinder which could be cut into lengths, screw-threaded internally, and shaped externally. In coiling the metal it was found that the inner part of the bar became thicker by the compression and the outer part of the bar became thinner by the extension to which these parts were respectively subjected, so that the convolutions appeared more or less separated externally, and consequently bars of taper section came to be used, the bar being made thinner on the side which was to form the inner face of each convolution and thicker on the side which was to form the outer face of each convolution. No determination has been made of the taper which should be given to bars of different widths and thickness in order to insure that each convolution should lie close to the next throughout its whole depth, and even when bars of a suitable taper have been used another result of the internal compression and external extension became a serious difficulty in the manufacturing of these nuts. This result is that owing to the extension the outer face of the coiled bar became concavely curved, and owing to the compression its inner face convexly curved, so that in shaping the outside of the nut extra metal had to be removed in order to get flat surfaces, and before threading the nut its interior had to be bored out in order to get a true uninterrupted cylindrical surface suitable for giving a sound screw-thread. This, besides wasting metal, involved so much work that the manufacture of nuts in this way was too expensive to be commercially profitable.

The present invention has for its object to avoid these difficulties by the use of an improved section of bar, as will be described, referring to the accompanying drawings.

Figure 1:
Figure 2:
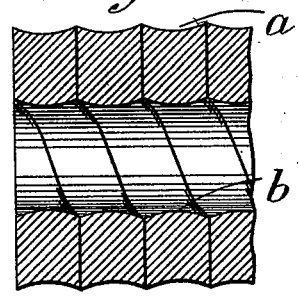
Figure 6:
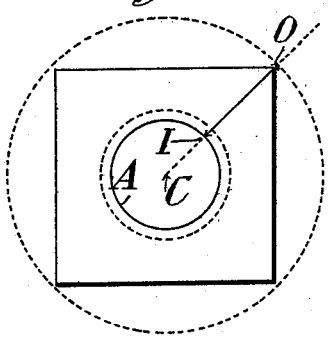
Figure 3:
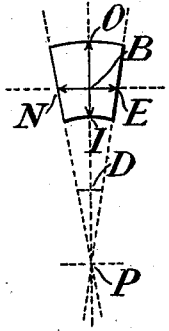
Figure 4:
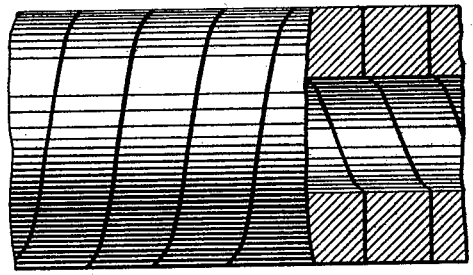
Figure 5:
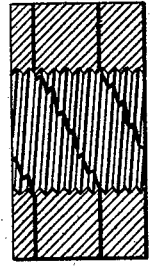

Figure 1 is a transverse section of bar such as has sometimes been used for coiling. Fig. 2 is a longitudinal section of the coil made from such a bar. Fig. 3 illustrates the way of determining the section of bar according to the present invention. Fig. 4 is a part elevation, part longitudinal section, of the coil produced; and Fig. 5 is a longitudinal section of the nut. Fig. 6 is a plan of a square nut, and Fig. 7 of a hexagonal nut.

Figure 7:
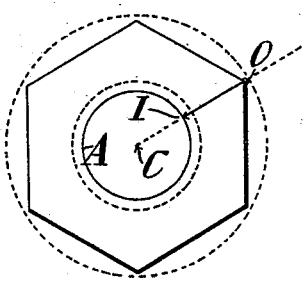

When a bar of the section shown in Fig. 1 is employed, the coil, as stated above, presents, as shown in Fig. 2, externally a series of hollows $a$, resulting from a concavity of each convolution, and internally a series of rounded projections $b$, resulting from a convexity of each convolution. In order to counteract this, a section of bar (shown in Fig. 3) is adopted which, besides having suitable taper, has its wide or outer side convex and its narrower or inner side concave, the convexity and concavity being such that when the bar is coiled both the outside and the inside of the coil are true cylinders. The sectional form shown in Fig. 3 is determined as follows:

Referring first to Figs. 6 and 7, in which the circle A indicates a transverse section of the belt at the bottom of the thread, the dotted circle around it indicating the section over the top of the thread, the width of the nut across flats being given, the square or hexagon outline is drawn in the usual way, and a radius is drawn from the center C to one of the angles. In order to allow for finishing the nut, this radius is extended a little, practically about one-twentieth of an inch, to the point O. The length of the line I O from the point I, where this radius cuts the circle A, to the terminal point O of the slightly-extended radius is the depth of the bar which has to be coiled in order to make a nut of the dimensions shown in Figs. 6 and 7. When the nut is to be round, of a given diameter, the depth of bar should exceed the distance from the circle A to the exterior of the finished nut by a small amount—say one-thirtieth of an inch—to allow for finishing.

Referring now to Fig. 3, the depth O I, determined as described with reference to Figs. 6 and 7, is divided into five equal parts. Through B, the second division from I and the third from O, is drawn a line E N at right angles to I O, and the lengths B E and B N, each equal to B I, are set off, these determining the width N E of the bar at what may be termed its "neutral" line, it having been found by experiment that by the coiling that part of the bar which is outside N E becomes narrowed and the part inside becomes widened, so that the width of each convolution is uniform throughout its depth. In order to determine the slope of the sides of the bar, twice the depth I O is set off from I, fixing a point P, whence lines are drawn through N and E, determining the sloping sides of the bar, and, finally, from a center D, set off from I, such that D I is equal to I O, circular arcs are struck through O and I, determining the outside and inside curvatures of the bar.

Although the width N E is described as being double the depth B I, it might be somewhat wider or narrower, according as the number of convolutions may be less or greater for each nut.

As shown in Figs. 4 and 5, the bar is coiled so as to form a left-hand helix, this being for a nut having a right-hand thread, so that when the nut has been screwed down any tendency for it to unscrew itself has the effect of locking it more firmly on the bolt. For a nut having a left-hand thread the coil is preferably, for the same reason, a right-hand helix.

Having thus described the nature of our invention and the best means we know for carrying the same into practical effect, we claim—

A blank for making helically-wound lock-nuts, consisting of a bar having two of its opposite sides flat and inclined toward one another, and its other two sides curved on the arcs of circles struck from a common center, the wider-curved side being convex and the narrower-curved side concave, substantially as shown and described whereby the compression and extension of the convex and concave sides, respectively, caused by the coiling of the bar, produce a smooth exterior and interior surface to the nut.

In testimony whereof we have signed our names to this specification, in the presence of two subscribing witnesses, this 25th day of March, A. D. 1896.

THOMAS GARE.
THOS. S. HARDEMAN.

Witnesses:
E. FORESTER,
U. H. TUNSTALL.